(12) United States Patent
Du et al.

(10) Patent No.: US 9,408,231 B2
(45) Date of Patent: Aug. 2, 2016

(54) EXTENDED ACCESS BARRING MECHANISMS FOR MACHINE TYPE COMMUNICATIONS

(75) Inventors: Lei Du, Beijing (CN); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 3 days.

(21) Appl. No.: 14/115,680

(22) PCT Filed: May 9, 2011

(86) PCT No.: PCT/EP2011/057432
§ 371 (c)(1),
(2), (4) Date: Nov. 5, 2013

(87) PCT Pub. No.: WO2012/152310
PCT Pub. Date: Nov. 15, 2012

(65) Prior Publication Data
US 2014/0080531 A1   Mar. 20, 2014

(51) Int. Cl.
*H04B 7/00* (2006.01)
*H04W 74/00* (2009.01)
*H04W 48/06* (2009.01)
*H04W 76/02* (2009.01)

(52) U.S. Cl.
CPC ............ *H04W 74/006* (2013.01); *H04W 48/06* (2013.01); *H04W 76/02* (2013.01)

(58) Field of Classification Search
CPC . H04W 74/0833; H04W 48/02; H04W 48/06; H04W 74/0841; H04W 74/085; H04W 28/0289; H04W 74/0875; H04W 48/16; H04W 74/04

USPC .......................................... 455/509; 370/230
See application file for complete search history.

(56) References Cited

U.S. PATENT DOCUMENTS

2012/0281530 A1* 11/2012 Sambhwani et al. ......... 370/230

FOREIGN PATENT DOCUMENTS

WO   WO 2007/052971 A1   5/2007
WO   WO 2010/102082 A1   9/2010

OTHER PUBLICATIONS

3GPP TSG-RAN WG2 Meeting #73bis, Shanghai, China, Apr. 11-15, 2011, R2-111918, "Extended Access Barring for Delay Tolerance Devices", ZTE, 10 pgs.
3GPP TSG SA WG1, Feb. 14-18, 2011, S1-110146, "Analysis of Extended Access Barring", Qualcomm Europe, 4 pg.
3GPP TSG-SA WG1 Meeting #53, Nashville, TN, USA, Feb. 14-18, 2011, S1-110147, "MTC Specific Access Classe Barring", Qualcomm Inc., 6 pgs.
3GPP TS 36.331 V10.1.0 (Mar. 2011), "$3^{rd}$ Generation Partnership Project; Technical Specification Group Radio Access Network; Evolved Universal Terrestrial Radio Access (E-UTRA); Radio Resource Control (RRC); Protocol specification (Release 10)", 290 pgs.

(Continued)

*Primary Examiner* — Tu X Nguyen
(74) *Attorney, Agent, or Firm* — Harrington & Smith

(57) ABSTRACT

Methods, apparatuses and a computer program product for Extended Access Barring for machine type communications defining first access class barring parameters, a first scaling factor and a second scaling factor, and transmitting, by a base station, the first access class barring parameters, the first scaling factor and the second scaling factor to user equipment.

21 Claims, 5 Drawing Sheets

(56) References Cited

OTHER PUBLICATIONS

RP-100330, RAN Improvements for Machine-type Communications 3GPP TSG-RAN #47 Vienna, Austria, Mar. 16-19, 2010, Huawei (5 pages).

RP-101026, RAN mechanisms to avoid CN overload due to Machine-Type Communications; 3GPP™ Work Item Description (5 pages).

R2-112661 Draft report of RAN2 #73bis, Shanghai, China 3GPP TSG-RAN Working Group 2 meeting #74 ETSI MCC [Barcelona, Spain, May 9-13, 2011] (145 pages).

3GPP TS 22.011 V10.3.0 (Mar. 2011) 3rd Generation Partnership Project; Technical Specification Group Services and System Aspects; Service accessibility (Release 10) (26 pages).

GP-101903, realizing extended access barring, Telefon AB LM Ericsson, ST-Ericsson; 3GPP TSG GERAN #48 San Jose Del Cabo, Nov. 22-26, 2010 (3 pages).

\* cited by examiner

EXTENDED ACCESS BARRING MECHANISMS FOR MACHINE TYPE COMMUNICATIONS

FIELD OF THE INVENTION

The present invention relates to Extended Access Barring (EAB) mechanisms for machine type communications (MTC).

In particular, the present invention focuses to lower the overhead in system information (SI) when extension of access barring (EAB) is used in MTC environment. Particular components are for example eNBs and UEs in networks like e.g. LTE (long term evolution), LTE-A, and the like.

BACKGROUND OF THE INVENTION

Machine Type Communication (MTC) is a form of data communication which involves one or more entities that do not necessarily need human interaction. One Study Item was opened in 3GPP Rel10 led by RAN2 discussing the RAN optimization for MTC (cf. document [1]). Before it came to any conclusion, another Work Item pre-empts focusing on the RAN optimization to avoid Core Network overload (cf. document [2]).

Currently, the Rel10 Work Item [2] is almost completed, wherein a "delay tolerant access" has been agreed to identify the delay tolerant request using one of the spare value of RRC establishment cause. When eNB detects the cause, it could set an extended wait timer when responding to the request message so that the UE could be delayed from access reattempt for a longer time period up to 30 minutes.

The Rel10 Study Item [1] resumed from the RAN2#73bis meeting limiting to RAN overload control only. In the RAN2#73bis meeting, it was agreed that Extension of Access Barring (EAB) based on SA1 requirements will be introduced as the baseline for RAN overload control in Rel-11 (cf. document [3]). Therefore, in the present application, it will be discussed how to implement EAB for Rel11.

The SA1 requirements on EAB are described in document [4]. According to this document, "Extended Access Barring (EAB) is a mechanism for the operator(s) to control Mobile Originating access attempts from UEs that are configured for EAB in order to prevent overload of the access network and/or the core network". More specifically, it requires that EAB information shall define whether EAB applies to UEs within one of the following categories:
  a) UEs that are configured for EAB;
  b) UEs that are configured for EAB and are neither in their HPLMN nor in a PLMN that is equivalent to it;
  c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN Therefore, the EAB should differentiate the UEs among the three categories and apply different barring policies/values to them. Moreover, it is observed that category b) is a subset of category a), and that category c) is a subset of category b). UEs within category c) belong to category b) and a) as well. Then, which category the UE should apply when it belongs to multiple category should be defined.

The straightforward way to implement EAB is to apply the same principle as is defined in current specification, i.e. define three set of access class parameters to above categories, respectively. However, this leads to signaling overhead to SIB.

Therefore, according to the present invention, some methods to enable the EAB with less overhead are proposed.

Currently, according to document [5], two sets of access class (AC) barring parameters are defined for the access requests where the establishment cause is set as "mobile originating signaling" and "mobile originating data" access requests, respectively. Within each set, three parameters are defined:
  ac-barring factor: If the random number drawn by the UE is lower than this value, access is allowed. Otherwise the access is barred;
  Ac-barringtime: Mean access barring time value in seconds;
  Ac-barringforspecialAC: Access class barring for AC11-15. The first/leftmost bit is for AC 11, the second bit is for AC 12, and so on.

In addition to above two sets of ac barring parameters, service specific access barring (SSAC) and ac barring for CSFB (CS Fallback) are also defined.
  Ac-barringCSFB: includes a set of access class barring parameters which are applied for mobile originating CS fallback calls;
  ssac-BarringForMMTEL-Voice: includes a set of access class barring parameters which are applied for MMTEL voice originating calls;
  ssac-BarringForMMTEL-Video: includes a set of access class barring parameters which are applied for MMTEL video originating calls.

These AC barring mechanisms do not treat UEs that are configured for EAB. Moreover, such set includes configuration for special AC, however, UEs with special AC should be given higher priority and therefore could be excluded from EAB parameters.

In GERAN (GSM EDGE Radio Access Network), some companies proposed to define extended access classes to enable EAB (cf. document [6]). However, the newly defined access classes are required. However, it was not agreed by CT1 and EAB is expected to be defined without new access classes.

The following documents are referred to in the present application:
[1] RP-100330, RAN Improvements for Machine-type Communications;
[2] RP-101026, RAN mechanisms to avoid CN overload due to Machine-Type Communications;
[3] R2-112661 Draft report of RAN2 #73bis, Shanghai, China;
[4] 3GPP TS 22.011 V10.3.0;
[5] 3GPP TS 36.331 v10.1.0;
[6] GP-101903, realizing extended access barring, Telefon AB LM Ericsson, ST-Ericsson.

SUMMARY OF THE INVENTION

As mentioned above, SA1 requires that extended access barring is defined to control mobile originating access attempts from MTC, roaming MTC, and/or roaming MTC but mot in the preferred PLMN list, in order to prevent overload of the access network and/or the core network.

The problem is how to design EAB to allow different barring parameters for the three categories to be communicated while limiting the signaling overhead to system information.

According to the present invention, there are provided methods, apparatuses and a computer program product for extended access barring mechanisms for MTC.

According to an aspect of the invention there is provided a method, comprising:

defining first access class barring parameters, a first scaling factor and a second scaling factor; and transmitting, by a base station, the first access class barring parameters, the first scaling factor and the second scaling factor to user equipment.

According to further refinements of the invention as defined under the above aspects the first access class barring parameters are associated with user equipment belonging to a first category, the second access class barring parameters are associated with user equipment belonging to a second category and the third access class barring parameters are associated with user equipment belonging to a third category;

the access class barring parameters are access class barring factor and access class barring time.

According to another aspect of the present invention there is provided a base station, comprising:

a unit configured to define first access class barring parameters, a first scaling factor and a second scaling factor; and a transmitting unit configured to transmit the first access class barring parameters, the first scaling factor and the second scaling factor to user equipment.

According to further refinements of the invention as defined under the above aspects the access class barring parameters are access class barring factor and access class barring time.

According to another aspect of the present invention there is provided a method, comprising:

receiving first access class barring parameters, a first scaling factor and a second scaling factor;

deriving second access class barring parameters based on the first access class barring parameters and the first scaling factor; and deriving third access class barring parameters based on the first access class barring parameters, the first scaling factor and the second scaling factor.

According to another aspect of the present invention there is provided a method comprising:

receiving a first access class barring parameter;

deriving a second access class barring parameter based on the first access class barring parameter and a predetermined first scaling factor; and deriving a third access class barring parameter based on the first access class barring parameter, the predetermined first scaling factor, and a predetermined second scaling factor.

According to further refinements of the invention as defined under the above aspects the first access class barring parameters are associated with user equipment belonging to a first category, the second access class barring parameters are associated with user equipment belonging to a second category and the third access class barring parameters are associated with user equipment belonging to a third category.

the method further comprises determining, to which category the user equipment belongs, and applying the respective access class barring parameters associated with the determined category;

the method further comprises if it is determined that the user equipment belongs to more than one category, applying the access class barring parameters associated with a predetermined one of the two or more categories among the categories to which the user equipment belongs;

the access class barring parameters are access class barring factor and access class barring time.

According to another aspect of the present invention there is provided a user equipment, comprising:

a receiving unit configured to receive first access class barring parameters, a first scaling factor and a second scaling factor;

a calculating unit configured to derive second access class barring parameters based on the first access class barring parameters and the first scaling factor; and further configured to derive third access class barring parameters based on the first access class barring parameters, the first scaling factor and the second scaling factor.

According to another aspect of the present invention there is provided a user equipment, comprising:

a receiving unit configured to receive a first access class barring parameter;

a calculating unit configured to derive a second access class barring parameter based on the first access class barring parameter and a predetermined first scaling factor; and further configured to derive a third access class barring parameter based on the first access class barring parameter, the predetermined first scaling factor, and a predetermined second scaling factor.

According to further refinements of the invention as defined under the above aspects the first access class barring parameters are associated with user equipment belonging to a first category, the second access class barring parameters are associated with user equipment belonging to a second category and the third access class barring parameters are associated with user equipment belonging to a third category.

the user equipment further comprises determining, to which category the user equipment belongs, and applying the respective access class barring parameters associated with the determined category.

the user equipment further comprises, if it is determined that the user equipment belongs to more than one category, applying the access class barring parameters associated with a predetermined one of the two or more categories among the categories to which the user equipment belongs.

the access class barring parameters are access class barring factor and access class barring time.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

With respect to the above and the following description of embodiments of the invention, it is noted that the terms "means" and "units" as used in the description and Figures have the same meaning and are thus interchangeable.

BRIEF DESCRIPTION OF THE DRAWINGS

These and other objects, features, details and advantages will become more apparent from the following detailed description of embodiments of the present invention which is to be taken in conjunction with the appended drawings, in which.

DETAILED DESCRIPTION

Figure 1:
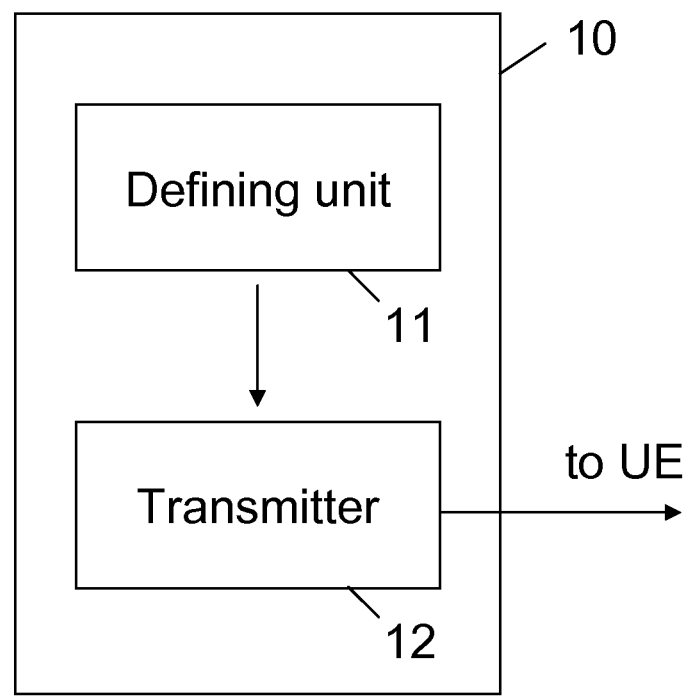
FIG. 1 is a block diagram showing a base station according to an embodiment of the present invention.

In the following, embodiments of the present invention are described by referring to general and specific examples of the embodiments. It is to be understood, however, that the description is given by way of example only, and that the described embodiments are by no means to be understood as limiting the present invention thereto.

According to an embodiment of the present invention, there are proposed the following principles for EAB:

According to an option 1, new EAB parameters (e.g. EAB-config), including ac-barring factor and ac-barring time, for UEs within category a), and two scaling factors for UEs within category b) and c) respectively, i.e. scaling_b, scaling_c, are defined.

The ac barring parameters for category b) could then be derived as follows:

Ac_barring factor (for category b))=Ac_barring factor (for category a))*scaling_b Ac_barring time (for category b))=Ac_barring time (for category a))/scaling_b A similar principle would then apply to UEs within category c).

Ac_barring factor (for category c))=Ac_barring factor (for category a))*scaling_b*scaling_c Ac_barring time (for category c))=Ac_barring time (for category a))/scaling_b/scaling_c In a case, in which the scaling factor is absent, the value is considered as 1 in the formulation.

According to an option 2, new EAB parameters are defined for category a) only. Further, there are no scaling factors advertised but with fix values are defined in the specification, e.g. the scaling factor always equals to 0.1.

According to an option 3, new EAB parameters are defined for category a) only, and only one scaling factor applies to both categories b) and c).

According to an option 4, only one scaling factor applies to category b), and the scaling factor for category c) is defined as 1/10 of the scaling factor for category b) or even square of the scaling factor for category b).

Another option could be to define only scaling factor (either signaling by eNB or predefined at UEs) for EAB. The ac barring parameters could be derived based on existing ac barring via some math calculation. E.g. scaling factor is 0.1, 0.2, 0.3 for category a), b), c) respectively.

With any of above rules, the UE should apply the EAB parameters upon indication from NAS layer, or only when delay tolerant Access is set as the establishment cause upon indication from the network access server (NAS).

1. If EAB parameters are present, the UE decides which category it belongs to and applies the AC barring parameters corresponding to that category.

If the UE belongs to more than one category, it should apply the ac barring parameters corresponding to the category in priority order, wherein c) has priority over b) which in turn has priority over a). For example, the category having the highest priority among the categories to which the UE belongs could be considered as being a predetermined category and the ac barring parameters are applied corresponding to the predetermined category.

2. If EAB parameters are absent, the UE uses normal AC barring parameters in current specifications.

In the above mentioned embodiment, there have been defined ac barring parameters for category a) and scaling factors for categories b) and c). However, it is noted that this is merely an example and that the present application is not limited thereto. It is also viable that there are defined ac barring parameters for category c) and scaling factors for categories a) and b). Further, also any other suitable combination is viable.

As described above, the present invention proposes some kind of signaling-efficient alternatives for signaling barring parameters for three groups of UEs, the groups being nested subsets of each other. Instead of explicitly signaling barring factor and barring time for each three types of UEs, it is proposed to signal only one of barring factor and barring time, and to derive the other ones through advantageous math functions to reduce signaling, either implicit or explicit.

For example, the barring factor would be known using the same coefficient that has been used to calculate the barring factor.

FIG. 1 is a block diagram showing a base station according to an embodiment of the present invention.

As shown in FIG. 1, the base station 10 comprises a defining unit 11 and a transmitter 12 connected to the defining unit.

Figure 2:
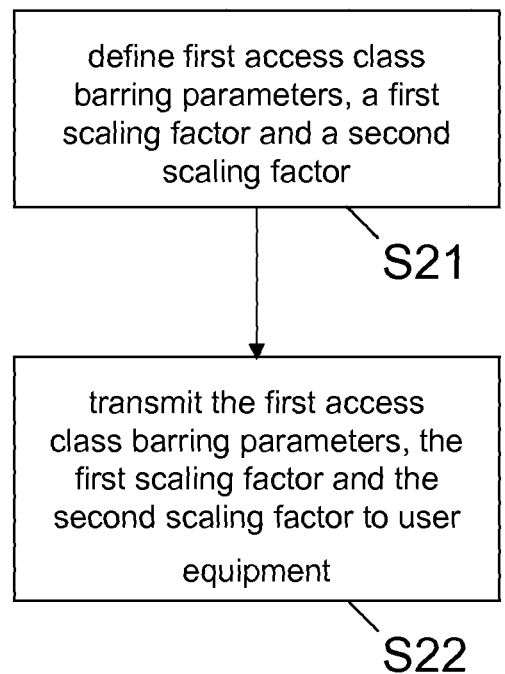
FIG. 2 is a flowchart showing a process according to an embodiment of the present invention.

FIG. 2 is a flowchart illustrating processing of the base station 10. First, in a step S21, the base station 10 defines first access class barring parameters, a first scaling factor and a second scaling factor. Then, in a step S22, the base station 10 transmits the first access class barring parameters, the first scaling factor and the second scaling factor to the user equipment.

Figure 3:
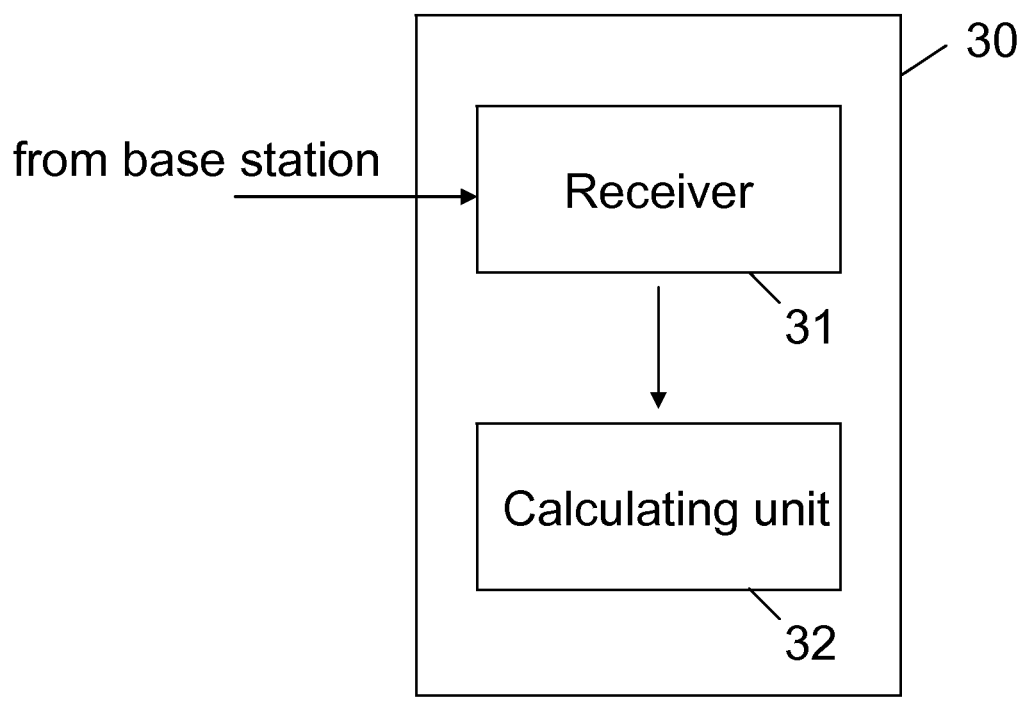
FIG. 3 is a block diagram showing a user equipment according to an embodiment of the present invention.

FIG. 3 is a block diagram showing a user equipment according to an embodiment of the present invention.

As shown in FIG. 3, the user equipment 30 comprises a receiver 31 and a calculating unit 32 connected to the receiver.

Figure 4:
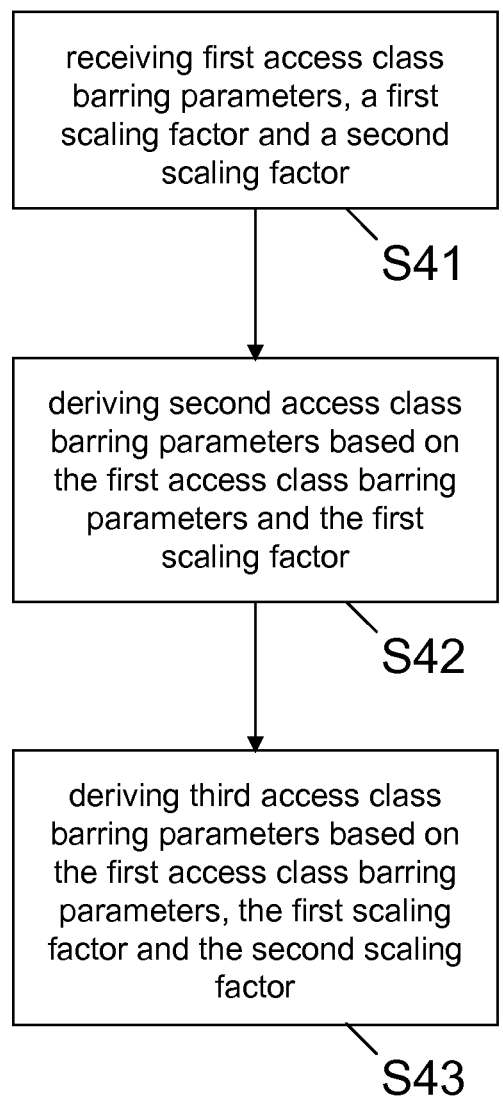
FIG. 4 is a flowchart showing another process according to an embodiment of the present invention.

FIG. 4 is a flowchart illustrating processing of the user equipment 30. First, in a step S41, the user equipment 30 receives first access class barring parameters, a first scaling factor and a second scaling factor from the base station via the receiver 31. Then, the calculating unit 32 derives second access class barring parameters based on the first access class barring parameters and the first scaling factor in step S42. Further, in a step S43, the calculating unit 32 derives third access class barring parameters based on the first access class barring parameters, the first scaling factor and the second scaling factor.

Figure 5:
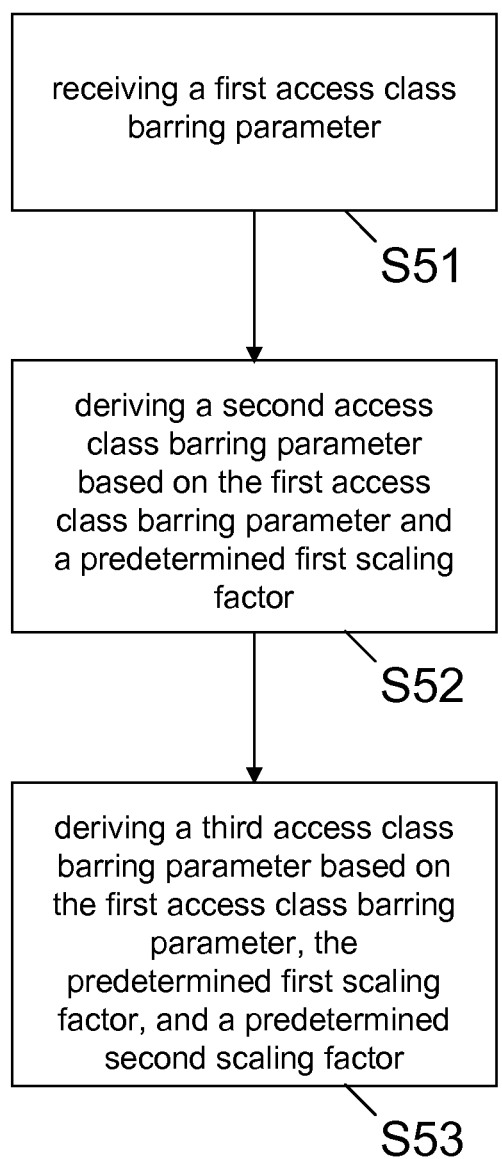
FIG. 5 is a flowchart showing another process according to an embodiment of the present invention.

FIG. 5 is a flowchart illustrating another processing of the user equipment 30. First, in a step S51, the user equipment 30 receives first access class barring parameters from the base station via the receiver 31. Then, the calculating unit 32 derives second access class barring parameters based on the first access class barring parameters and a predetermined first scaling factor in step S52. Further, in a step S53, the calculating unit 32 derives third access class barring parameters based on the first access class barring parameters, the predetermined first scaling factor and a predetermined second scaling factor.

In the foregoing exemplary description of the base station and the user equipment, only the units that are relevant for understanding the principles of the invention have been described using functional blocks. The base station and the user equipment may comprise further units that are necessary for its respective operation. However, a description of these units is omitted in this specification. The arrangement of the functional blocks of the devices is not construed to limit the invention, and the functions may be performed by one block or further split into sub-blocks.

Thus, as described above, according to the present invention, a scaling factor is used to calculate the access barring probability and barring time for the other two UE categories, i.e.
1. there are signaled two parameters for three kind of UE
2. parameters can advantageously be derived from one category to the other, using the same coefficient or factor, or by a simple mathematical function.
3. the network does not need to signal explicitly all the parameters, but only some of them and the relevant coefficient, or the UE can derive the other parameters, using a known mathematical function.

According to a further approach the scaling does not need to be necessarily signaled from the network but can be configured in the UE as well. And scale can be 0 or 1, i.e. fixed. (as described with respect to option 2).

An advantageous effect of the present invention is less signaling in the system information block (SIB). Further, according to the present invention, it is easier for the operator to configure (since there are fewer choices).

For the purpose of the present invention as described herein above, it should be noted that
  method steps likely to be implemented as software code portions and being run using a processor at a radio access node or user equipment (as examples of devices, apparatuses and/or modules thereof, or as examples of entities including apparatuses and/or modules therefore), are software code independent and can be specified using any known or future developed programming language as long as the functionality defined by the method steps is preserved;
  generally, any method step is suitable to be implemented as software or by hardware without changing the idea of the embodiments and its modification in terms of the functionality implemented;
  method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
  devices, units or means (e.g. the above-defined apparatuses and user equipments, or any one of their respective units/means) can be implemented as individual devices, units or means, but this does not exclude that they are implemented in a distributed fashion throughout the system, as long as the functionality of the device, unit or means is preserved;
  an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
  a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

The invention claimed is:
1. A method, comprising:
  defining first access class barring parameters, a first scaling factor for access class barring, and a second scaling factor for access class barring, wherein the first scaling factor and the second scaling factor are used to derive second access class barring parameters and third access class barring parameters; and
  transmitting, by a base station, the first access class barring parameters, the first scaling factor and the second scaling factor to user equipment.

2. The method according to claim 1, wherein
the first access class barring parameters are associated with user equipment belonging to a first category, the second access class barring parameters are associated with user equipment belonging to a second category and the third access class barring parameters are associated with user equipment belonging to a third category.

3. The method according to claim 1, wherein
the access class barring parameters are access class barring factor and access class barring time.

4. A computer program product including a non-transitory computer readable medium, comprising software code portions for performing the method of claim 1 when the code portions are run on a processing device.

5. An apparatus, comprising:
at least one processor; and
at least one memory including computer program code,
the at least one memory and the computer program code configured to, with the at least one processor, cause the apparatus to perform at least the following:
define first access class barring parameters, a first scaling factor for access class barring, and a second scaling factor for access class barring, wherein the first scaling factor and the second scaling factor are used to derive second access class barring parameters and third access class barring parameters; and
transmit the first access class barring parameters, the first scaling factor and the second scaling factor to user equipment.

6. The apparatus according to claim 5, wherein
the access class barring parameters are access class barring factor and access class barring time.

7. A method, comprising:
receiving at least one first access class barring parameter;
deriving at least one second access class barring parameter based on the at least one first access class barring parameters and a first scaling factor; and
deriving at least one third access class barring parameter based on the at least one first access class barring parameter, the first scaling factor and a second scaling factor.

8. The method according to claim 7, wherein
receiving at least one first access parameter further comprises receiving a first access class barring parameter;
the first scaling factor is a predetermined first scaling factor;
deriving at least one second access class barring parameter further comprises deriving a second access class barring parameter based on the first access class barring parameter and the predetermined first scaling factor;
the second scaling factor is a predetermined second scaling factor;
deriving at least one third access class barring parameter further comprises deriving a third access class barring parameter based on the first access class barring parameter, the predetermined first scaling factor, and the predetermined second scaling factor.

9. The method according to claim 7, wherein
there are a plurality of first, second, and third access barring parameters;
the plurality of first access class barring parameters are associated with user equipment belonging to a first category, the plurality of second access class barring parameters are associated with user equipment belonging to a second category and the plurality of third access class barring parameters are associated with user equipment belonging to a third category.

10. The method according to claim 9, further comprising
determining, to which category the user equipment belongs, and
applying the respective access class barring parameters associated with the determined category.

11. The method according to claim 10, further comprising,
if it is determined that the user equipment belongs to more than one category,
applying the access class barring parameters associated with a predetermined one of the two or more categories among the categories to which the user equipment belongs.

12. The method according to claim 7 wherein
the at least one first, second, and third access class barring parameters comprise access class barring factor and access class barring time.

13. A computer program product including a non-transitory computer readable medium, comprising software code portions for performing the method of claim 7 when the code portions are run on a processing device.

14. The method of claim 7, wherein:
receiving the at least one first access class barring parameter further comprises
receiving the first scaling factor and the second scaling factor;
deriving the at least one second access class barring parameter uses the received first scaling factor; and
deriving the at least one third access class barring parameter uses the received second scaling factor.

15. An apparatus, comprising:
at least one processor; and
at least one memory including computer program code,
the at least one memory and the computer program code configured to, with the at least one processor, cause the apparatus to perform at least the following:
receive at least one first access class barring parameter;
derive at least one second access class barring parameter based on the at least one first access class barring parameters and a first scaling factor; and
derive at least one third access class barring parameter based on the at least one first access class barring parameter, the first scaling factor and a second scaling factor.

16. The apparatus of claim 15, wherein:
receiving the at least one first access class barring parameter further comprises
receiving the first scaling factor and the second scaling factor;
deriving the at least one second access class barring parameter uses the received first scaling factor; and
deriving the at least one third access class barring parameter uses the received second scaling factor.

17. The apparatus of claim 15, wherein:
receiving at least one first access parameter further comprises receiving a first access class barring parameter;
the first scaling factor is a predetermined first scaling factor;
deriving at least one second access class barring parameter further comprises deriving a second access class barring parameter based on the first access class barring parameter and the predetermined first scaling factor;
the second scaling factor is a predetermined second scaling factor;
deriving at least one third access class barring parameter further comprises a third access class barring parameter based on the first access class barring parameter, the predetermined first scaling factor, and the predetermined second scaling factor.

18. The apparatus according to claim 15, wherein
there are a plurality of first, second, and third access barring parameters;
the plurality of first access class barring parameters are associated with user equipment belonging to a first category, the plurality of second access class barring parameters are associated with user equipment belonging to a second category and the plurality of third access class barring parameters are associated with user equipment belonging to a third category.

19. The apparatus according to claim 18, further comprising
determining, to which category the user equipment belongs, and
applying the respective access class barring parameters associated with the determined category.

20. The apparatus according to claim 19, further comprising, if it is determined that the user equipment belongs to more than one category,
applying the access class barring parameters associated with a predetermined one of the two or more categories among the categories to which the user equipment belongs.

21. The apparatus according to claim 15, wherein
the at least one first, second, and third access class barring parameters comprise access class barring factor and access class barring time.

* * * * *